June 16, 1925.
H. HENRICH
1,542,245
METHOD OF CHARGING SHAFT FURNACES WITH FINELY GROUND CHARGING
MATERIAL BY FEEDING INTO THE SMELTING ZONE
Filed Jan. 27, 1922
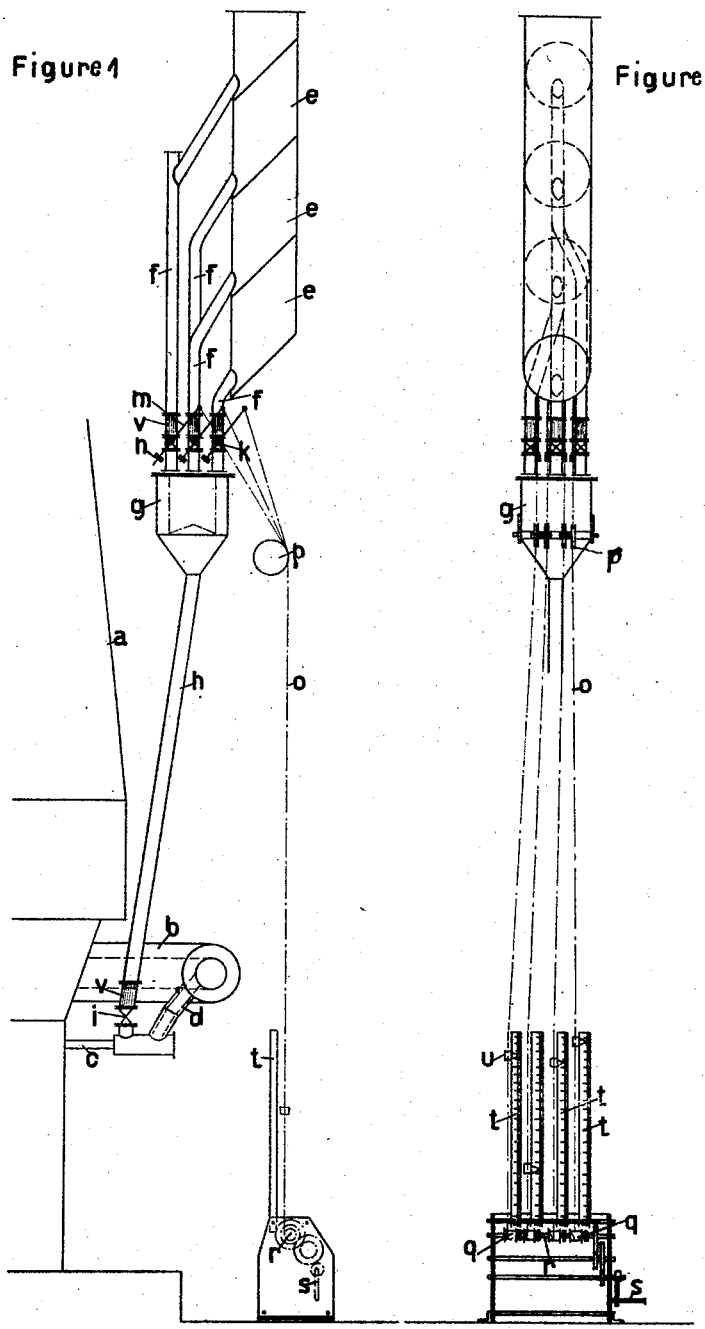
Inventor
H. Henrich
by
W. E. Evans
Attorney.

Patented June 16, 1925.

1,542,245

UNITED STATES PATENT OFFICE.

HERMANN HENRICH, OF DUISBURG, GERMANY, ASSIGNOR TO DEUTSCHE MASCHINEN-FABRIK A. G., OF DUISBURG, GERMANY.

METHOD OF CHARGING SHAFT FURNACES WITH FINELY-GROUND CHARGING MATERIAL BY FEEDING INTO THE SMELTING ZONE.

Application filed January 27, 1922. Serial No. 532,287.

*To all whom it may concern:*

Be it known that I, HERMANN HENRICH, a citizen of the German State, residing at 112 Hindenburgstrasse, Duisburg, Germany, have invented a certain new and useful Method of Charging Shaft Furnaces with Finely-Ground Charging Material by Feeding into the Smelting Zone, of which the following is a specification.

Various methods are known by the aid of which charging material is fed in a finely ground or granular condition to the melting zone of a shaft furnace, in order thereby to influence the melting process. The known methods, however, have the disadvantage that the feeding of the charging material into the smelting zone cannot be carried out with certainty as to the required quantity or proportions owing to the charging material being mixed on the floor of the foundry and in this mixed state being passed through tubular conduits under the action of air under pressure into overhead containers, whence it passes downwardly through suitably provided piping. In consequence of the differing specific gravities of the ingredients employed, a more or less considerable separation takes place, while being conveyed upwards, so that the charge does not reach the overhead container in quite the original state of admixture. The result is that the charge does not reach the smelting zone in the desired proportions. Furthermore in consequence of the lengthy journey made by the mixed ingredients on passage to the smelting zone, any necessary alteration in the mixing proportions comes into effect proportionately late in the smelting process. In order to avoid this disadvantage it is inadvisable to feed the materials separately, as according to their various physical and chemical properties they behave differently in the conduit pipes, that is to say the particular materials will tend more or less to cake on the walls of the pipes.

According to the present invention these disadvantages are removed in a simple manner by mixing the charging material above the smelting zone, and then feeding it to the furnace in the smelting zone. The plant can be so constructed that one or more mixing containers are arranged above the smelting zone, communicating with the smelting zone by means of pipes. The charging ingredients can thus, in any desired manner, be brought at the same time, but separately into a mixing container, which may be of the rotary type. In such a plant it is convenient to provide the regulating valves controlled in the manner hereinafter described.

The invention comprises the method and apparatus hereinafter described.

The drawing illustrates an example of the working of the apparatus for carrying out the process.

Fig. 1 is a side view of the apparatus.

Fig. 2 is a front view.

In this drawing, $a$ is a blast furnace, $b$ is the annular hot blast conduit arranged in the well known manner at the lower end of the furnace, $c$ is a hot blast tuyère which is in connection with the hot blast conduit through the pipes $d$, and leads into the smelting zone of the furnace. At a certain height above this smelting zone, several containers $e$ are arranged one over the other, which serve to receive the charging materials in a finely divided condition, such as fuel, lime, and ore, etc. A conduit pipe $f$ leads from each of these containers into a mixing container $g$. A conduit pipe $h$ leads from this container into the blast tuyère $c$. $i$ is a regulating valve in the conduit $h$. Above the container $g$ a flap valve $k$ is fitted in each of the conduits $f$, which can be operated from the outside by means of the corresponding lever $m$, which is held in position by a counterweight, in such a manner that the cross section of the passage through which the charging material flows may be varied at will. The counterweights $n$ have here the function of keeping the regulating flap valve $k$ closed. On the free end of the levers $m$ are attached tension members $o$, ropes or the like, which pass over rollers $p$ and are wound on drums $q$ close to the melting zone. The drums are mounted on a common shaft $r$ in such a manner that each particular drum can remain independent of the rotation of the shaft $r$ in any position. By the aid of the hand crank $s$ the shaft $r$ can be rotated in either direction. Graduated scales $t$ are fixed above the drums running parallel with the ropes $o$. Pointers $u$ are attached to each rope, passing over the corresponding scale $t$. The diameter of the bore of the separate conduits $f$ can in this way be controlled from the floor. In the conduits *f* and the conduit *h* transparent sections of piping *v* are inserted, which allow a direct inspection to be made of the charging material as it flows through.

Briefly described, the method of working is the following:

The charging ingredients, which have been introduced into the separate holders in any suitable way, pass through the conduit pipes *f* to the mixing container *g*, and thence through the conduit *h* and the hot blast tuyère *c* into the smelting zone of the furnace. The mixing proportion can be directly determined and regulated by means of the gearing *s r q*, so that the mixture which has been made is passed at once into the furnace, the extent of its travel being relatively short. For the thorough mixing of the charging materials it is recommended to have the mixing container constructed of the well known rotating type. Furthermore it is possible for weighing appliances to be arranged in the conduits *f* in order to determine the quantities of the various charging ingredients to be introduced into the mixing container *g*.

The constructional form of the entire plant as well as the regulating gearing is not of importance for the purpose of the present invention. It will be understood that the charge is mixed above the smelting zone and then fed to the furnace in the smelting zone, and furthermore that the control of the mixing can take place at any position desired.

I claim:

1. A method of charging finely divided substances such as ore, fuel and flux into the smelting zone of blast furnaces, consisting in separately disposing the substances in position immediately above the smelting zone, feeding the said substances under directly controlled regulation into a mixing container, and thence feeding the mixed substances to the furnace by means of the blast air, substantially as described.

2. Apparatus for charging into the smelting zone of blast furnaces by way of the air blast tuyères finely divided substances such as ore, fuel and flux, comprising a number of separate containers for the said substances, a mixing container disposed beneath the said containers, conduits between the said containers and the said mixing container through which the said substances may respectively pass, valves on the said conduits, means for independently regulating the said valves, and a conduit between the said mixing container and the air blast pipes, substantially as described.

3. Apparatus for charging into the smelting zone of blast furnaces by way of the air blast tuyères finely divided substances such as ore, fuel and flux, comprising a number of separate containers for the said substances, a mixing container disposed beneath the said containers, conduits between the said containers and the said mixing container through which the said substances may respectively pass, valves on the said conduits, means for independently regulating the said valves comprising weighted levers by which the said valves are actuated, drums by which the said levers are operated, flexible transmission elements one end of each of which is respectively connected to one of the said weighted levers, and the other end of which is wound upon one of the respective drums, graduated scales disposed beside and parallel with the said transmission elements, pointers respectively mounted upon the said elements in position adjacent the said respective gradulated scales, and a conduit between the said mixing container and the air blast pipes, substantially as described.

4. Apparatus for charging into the smelting zone of blast furnaces by way of the air blast tuyères finely divided substances such as ore, fuel and flux, comprising a number of separate containers for the said substances, a mixing container disposed beneath the said containers, conduits between the said containers and the said mixing container through which the said substances may respectively pass, valves on the said conduits, transparent sections in the said conduits, means for independently regulating the said valves, and a conduit between the said mixing container and the air blast pipes, substantially as described.

5. Apparatus for charging into the smelting zone of blast furnaces by way of the air blast tuyères finely divided substances such as ore, fuel and flux, comprising a number of separate containers for the said substances, a mixing container disposed beneath the said containers, conduits between the said containers and the said mixing container through which the said substances may respectively pass, valves on the said conduits, means for independently regulating the said valves comprising weighted levers by which the said valves are actuated, drums by which the said levers are operated, flexible transmission elements one end of each of which is respectively connected to one of the said weighted levers, and the other end of which is wound upon one of the respective drums, graduated scales disposed beside and parallel with the said transmission elements, pointers respectively mounted upon the said elements in position adjacent the said respective graduated scales, a conduit between the said mixing container and the air blast pipes, and a transparent section in the said conduit, substantially as described.

HERMANN HENRICH.